United States Patent [19]

Ruzic

[11] 4,220,828

[45] Sep. 2, 1980

[54] TELEPHONE SUBSET

[75] Inventor: Hugo Ruzic, Leonberg, Fed. Rep. of Germany

[73] Assignee: International Standard Electric Corporation, New York, N.Y.

[21] Appl. No.: 1,813

[22] Filed: Jan. 8, 1979

Related U.S. Application Data

[63] Continuation-in-part of Ser. No. 888,903, Mar. 22, 1978, abandoned.

[51] Int. Cl.² .............................................. H04M 1/02
[52] U.S. Cl. ................................. 179/100 D; 179/179
[58] Field of Search .......... 179/100 R, 100 D, 146 R, 179/147, 178, 179, 185; D14/53, 58, 59, 60, 62, 63, 64

[56] References Cited

U.S. PATENT DOCUMENTS

| D. 197,281 | 1/1964 | Dreyfuss et al. | D14/62 |
|---|---|---|---|
| D. 207,996 | 6/1967 | Upjohn | D14/62 |
| D. 243,691 | 4/1977 | Buchin et al. | D14/58 |
| 3,179,751 | 4/1965 | Harrold | 179/100 D |
| 3,413,423 | 11/1968 | Stevko | 179/100 D |
| 3,491,221 | 1/1970 | Zamarra | 179/178 |
| 3,657,487 | 4/1972 | Schwanck et al. | 179/179 |

FOREIGN PATENT DOCUMENTS 2705963  5/1978  Fed. Rep. of Germany ........... 179/179

OTHER PUBLICATIONS

ITT Telecommunications Bulletin; p. 347.04; Nov. 1969.

Primary Examiner—James W. Moffitt
Assistant Examiner—Randall P. Myers
Attorney, Agent, or Firm—John T. O'Halloran; Alfred C. Hill

[57] ABSTRACT

The housing of the telephone subset consists of one piece made of a plastic material preferably shaped by a blow-moulding technique. The housing has a frontal sloping opening which is covered by a detachable control panel to which all the usual built-in components of a telephone subset are mounted.

5 Claims, 5 Drawing Figures

U.S. Patent  Sep. 2, 1980  4,220,828
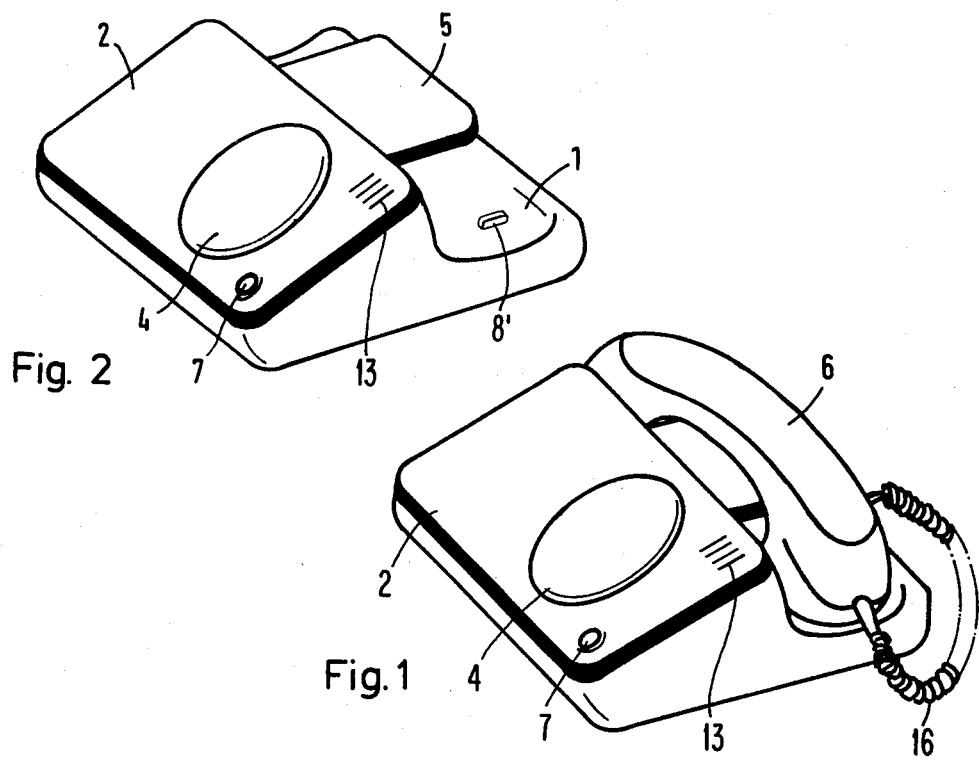
Fig. 2
Fig. 1
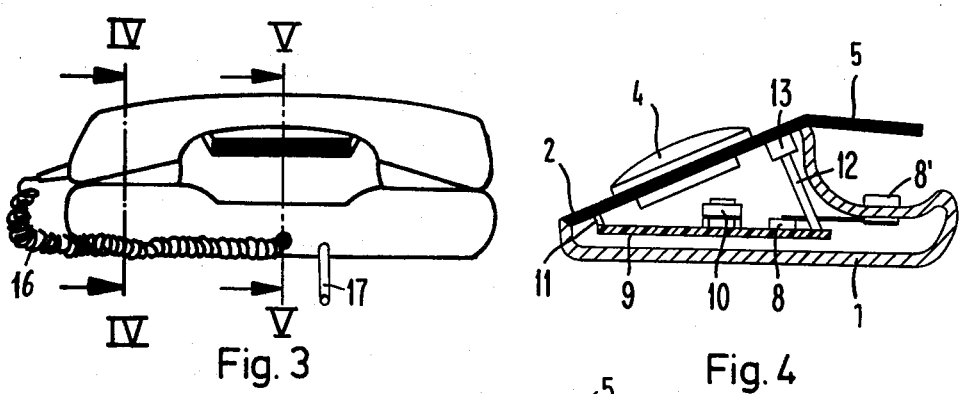
Fig. 3
Fig. 4
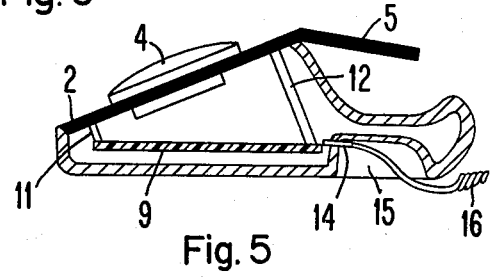
Fig. 5

TELEPHONE SUBSET

CROSS-REFERENCE TO RELATED APPLICATIONS

This is a continuation-in-part application of patent application Ser. No. 888,903, filed Mar. 22, 1978 now abandoned.

BACKGROUND OF THE INVENTION

The present invention relates to telephone subsets and more particularly to a telephone subset having a two-part housing with one part thereof being provided with a rest for the handset.

In almost all telephone subsets having a separate handset, the housing consists of two parts: the base plate and the cover portion. The latter includes the major portion of the housing and is thus distinctive of both the design and the outer appearance of the subset.

The built-in components are partly mounted inside the cover portion (such as the dial switch) and partly on the base plate (such as the ringer). With the more recent subsets, such as the FeTAp 61 of the German Bundespost, almost all component parts, for instance, the dial switch, cradle switch, ground button, reactance coil, etc, as well as a printed circuit, are mounted to the base plate. The cover portion chiefly has an aesthetic function, but also includes the handset rest as well as the cradle switch supports and a handling pocket for carrying the subset.

The cover portion as well as the base plate of such subsets, however, place increased requirements on the design which must avoid e.g. undercuttings and visible seam lines. The tools of manufacturing these parts are very complicated and expensive. Owing to the various connecting dimensions, it is necessary to adhere to narrow tolerances. Thus, it must be safeguarded that the dial switch and, if so required, also the head of the grounding pushbutton key mounted on the base plate can pass through the opening(s) provided in the cover portion. By such designs both the assembly and the maintenance are rendered more difficult.

SUMMARY OF THE INVENTION

An object of the present invention is to provide a different design concept for a telephone subset involving reduced tooling costs and simplifying both the assembly and the maintenance.

A feature of the present invention is the provision of a telephone subset having usual built-in components comprising: a box-like housing member having an opening in a frontal sloping surface thereof; a control panel disposed to close the opening and to be detachably secured to the member; and a printed circuit board supported from the control panel is a spaced relation thereto; certain ones of the components being directed secured to the panel and the remainder of the components being mounted on the board.

The control panel closes the assembly opening of the other box-like housing member and at the same time acts as the mounting board for all electrical and electromechanical components of the telephone subset. The control panel may be injection-moulded as well as cast, but involves the lowest investment when made from sheetmetal. The housing member is the only shaped part. When the housing member is blow-moulded, the mould requires no slides, there are no problems of seams, and small undercuttings are of no importance. In this way it is possible to achieve quite considerable savings, especially since very cost-effective plastics materials can be used for manufacturing such shaped parts without adversely affecting the outer appearance of the subset.

BRIEF DESCRIPTION OF THE DRAWING

Above-mentioned and other features and object of this invention will become more apparent by reference to the following description taken in conjunction with the accompanying drawings, in which:

FIG. 1 is a perspective view of the telephone subset in accordance with the principles of the present invention;

FIG. 2 is a perspective view of the same subject as illustrated in FIG. 1, but with the handset removed;

FIG. 3 is a rear view of the subset of FIG. 1; FIG. 4 is a cross-sectional view taken along line IV—IV of FIG. 3; and FIG. 5 is a cross-sectional view taken along line V—V of FIG. 3.

DESCRIPTION OF THE PREFERRED EMBODIMENT

The Figures show a telephone subset whose housing 1 has an almost rectangular ground plane, with the handset 6 being arranged in the rear portion in a transverse relation thereto, while the control panel surface is slightly inclined in its front part. Handset 6 is integrated into the shape of housing 1, i.e. it hardly or not at all projects over the rear end and on the sides. Moreover, housing 1 is pulled down to such an extend behind the control panel surface, that substantially only the handle portion of handset 6 will project over housing 1 as such. Either continuously or at both ends, this drawn-down portion is designed to have the shape of a trough, as may be seen in FIGS. 2 and 4, serving as a rest for the transmitter and receiver members of handset 6.

Housing 1, with the exeception of the control panel 2, is made in one piece. In order to avoid unsightly bondings between several parts, housing 1 is manufactured from a plastic material in accordance with the blow-moulding technique which also well controls any undercuttings.

Control panel 2 is constituted by a rectangular plate which is preferably flat. This plate can be made of sheet-metal or plastics material and serves to cover the opening of housing 1 and also as a mounting board for all of the component parts to be built-in, such as the ringer, the cradle switch, the dial-switch unit, the circuit, etc., as indicated in FIGS. 4 and 5. Visible from the outside are only the selector-switch equipment 4 (dial switch or pushbutton dialling block) and, if necessary, the pushbutton keys 7 (grounding keys, line keys, and the like). This design makes the telephone subset easy to assemble and easy to service.

A hookswitch actuator 8' (FIGS. 2 and 4) is located in the trough portion of housing 1 to actuate a hook-switch 8 mounted like the other components, such as repeating coil 10 and connectors 14 (FIG. 5), on a printed circuit board 9 which is secured to posts 11 and 12 with these posts 11 and 12 being secured to or formed as a part of plate 2. Only equipment 4, keys 7 and electronic ringer 13 are mounted directly to plate 2.

The handset cord 16 (FIGS. 1, 3 and 5) and the line cord 17 are both connected to printed circuit 9 directly by plug-in type connectors 14 through the wall of a small chamber 15 provided in the bottom of housing 1.

At its upper edge, plate 2 is provided with a flange 5 projecting almost horizontally in the rearward direction. The length and the width of this flange are so dimensioned that it will fit under the handle portion of handset 6. With the aid of flange 5 the subset is easy to carry.

Both plate 2 and housing 1 are connected with one another either with the aid of snap-in devices or screws.

In the same way it is also possible to design a telephone subset whose handset is not intended to lie in a transverse relation with the control panel surface, but on one side next to it. Then merely the inclination of the control panel surface will have to extend in a different direction.

While I have described above the principles of my invention in connection with specific apparatus it is to be clearly understood that this description is make only by way of example and not as a limitation to the scope of my invention as set forth in the objects thereof and in the accompanying claims.

I claim:

1. A telephone subset having at least an electronic ringer, a hookswitch, selector-switch equipment, repeating coil, handset cord and line cord, connectors and pushbutton keys comprising:
   a box-like housing member having an opening in a frontal sloping surface thereof;
   a control panel disposed to close said opening and to be detachably secured to said member; and
   a printed circuit board supported from said control panel in a spaced relation thereto;
   only said equipment, said ringer and said keys being directly secured to said panel and said hookswitch, said repeating coil and said connectors being mounted on said board.

2. A subset according to claim 1, wherein
   said member is shaped to provide a rest for a handset of said subset rearward of said panel.

3. A subset according to claim 2, wherein said panel includes
   a flange extending into said rest to engage a handle portion of said handset and with which said subset can be carried.

4. A subset according to claim 2, wherein said rest is trough-shaped.

5. A subset according to claim 4, wherein said member is made from a plastic material employing a blow-moulding technique.

* * * * *